UNITED STATES PATENT OFFICE.

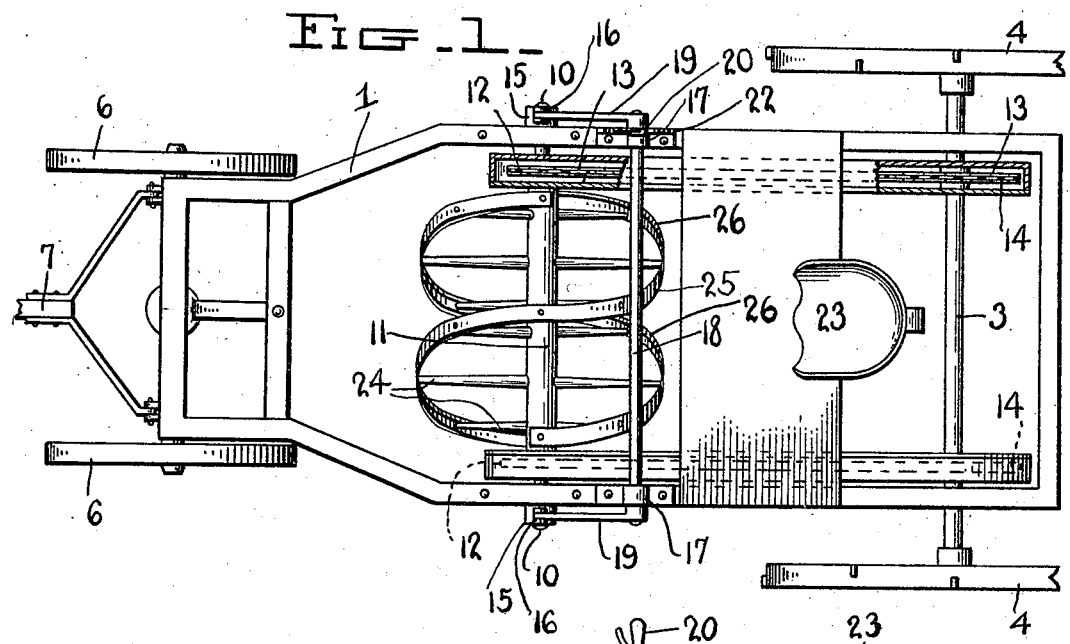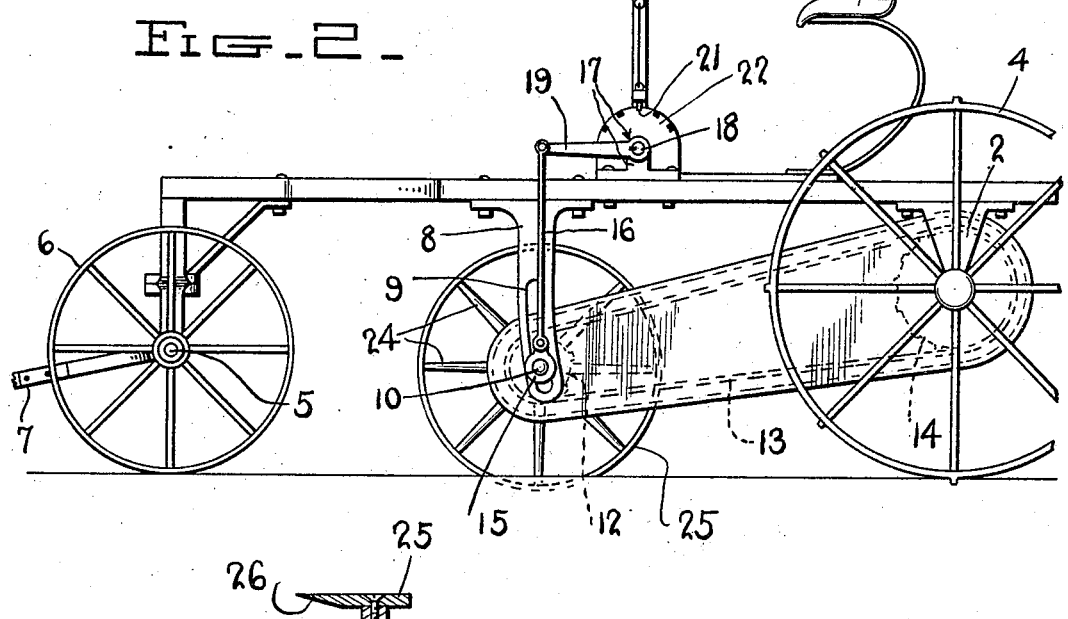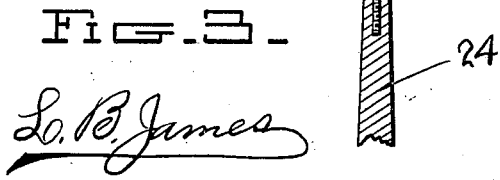

THOMAS J. KULA, OF MERINO, COLORADO.

CROWNING-MACHINE.

1,401,912. Specification of Letters Patent. Patented Dec. 27, 1921.

Application filed March 2, 1920. Serial No. 362,835.

*To all whom it may concern:*

Be it known that I, THOMAS J. KULA, a citizen of the United States, residing at Merino, in the county of Logan and State of Colorado, have invented new and useful Improvements in Crowning-Machines, of which the following is a specification.

This invention has reference to an agricultural implement.

In fields of alfalfa or other meadows where it is found desirous of planting other vegetation, as for instance beets, it has been found that by crowning or cutting down the meadow and thereafter plowing the ground and turning the cut alfalfa under, the ground is properly fertilized for receiving the new crop. It is the object of the present invention to produce a machine whereby alfalfa or other growth of vegetation may be crowned or cut down in an easy and expeditious manner and left on the ground for the plowing operation.

It is a further object to produce a wheeled implement having a transversely arranged shaft operated by the ground wheels of the implement and carrying any desired number of spiral blades which work in unison to effect a cutting action on alfalfa or other vegetation.

It is a still further object to produce a wheeled implement in which a spiral cutter is employed, and to provide means whereby the cutter may be adjusted vertically so that the vegetation may be cut at desired heights.

It is a still further object to produce a crowning machine which shall be of a comparatively simple construction, cheaply manufactured, easily operated, and thoroughly efficient in operation.

The foregoing, and other objects which will appear as the nature of the invention is better understood, may be accomplished by a construction, combination and operative arrangement of parts, such as is disclosed by the drawings.

In the drawings:—

Figure 1 is a top plan view of a crowning machine constructed in accordance with this invention.

Fig. 2 is a side elevation thereof.

Fig. 3 is a detail sectional view illustrating the manner in which one of the spiral cutting blades may be attached to the spokes which radiate from the revoluble shaft.

In carrying out my improvement I construct a frame 1 which has its side members adjacent its rear end provided with depending brackets 2 that have bearings for the revoluble axle 3 on which the ground wheels 4 are mounted. The front axle 5 which carries the steering wheel 6 is pivotally connected to the front end of the frame in the usual manner, and to the front axle or to the bolster therefor there is attached a tongue 7 to which the draft animals are secured.

On the side members of the frame, forward of the rear or ground wheels 4 there are secured oppositely disposed depending bracket members 8—8. The brackets 8 have their lower portions slightly curved and are provided with elongated slots 9. In these slots 9 there is received the reduced ends or trunnions 10 of a shaft 11. On the trunnion ends 10 of the shaft 11 there are secured sprocket wheels 12 around which are trained sprocket chains 13 that are also trained around sprocket wheels 14 secured to the revoluble rear axle 3. The sprocket wheels 14 are of a greater diameter than the sprocket wheels 12, and it will be apparent that when the machine is in motion the shaft 11 will be revolved.

The shaft 11 has its reduced or trunnioned ends 10 provided with collars 15 to which are attached links 16.

Journaled in bearings 17 on the upper surfaces of the side members of the frame 1 is a rod 18. This rod has angle ends 19 which are connected by pivots to the respective links 16. The rod has also fixed thereon a lever 20 provided with a handle operated spring pressed dog 21 that engages in the notches of a segment 22 that is secured to the frame. The lever is conveniently located with respect to the driver's seat 23, and by the operation thereof it will be apparent that the shaft 11 may be raised or lowered through the slotted brackets 8.

On the shaft 11 there are spaced radially disposed arms or spokes 24. To the outer ends of these arms or spokes are connected the spiral cutter members 25. The cutter members have one of their edges sharpened as at 26. Any desired number of spiral cutters may be employed, and it will be apparent that as the cutters are brought to engage with the vegetation over which the machine passes the same will be cut or crowned so that such vegetation can be readily turned under the soil in the plowing operation and thus fertilizing the soil for the new crop to be planted.

It is thought that the foregoing description, when taken in connection with the drawings will render the construction of the machine, the operation thereof and its advantages plain to those skilled in the art to which the invention relates. It is to be understood that the description and drawings refer to a satisfactory embodiment of the invention as it now appears to me, and that I am entitled to make such departures therefrom as fall within the scope of my claim.

Having thus described the invention, what I claim is:—

In a crowning machine for cutting alfalfa and like growth of vegetation for arranging the same on the ground prior to the plowing which turns the growth under the soil for manuring purposes, a frame having drive wheels journaled at one end thereof and guide wheels journaled at the opposite end thereof, oppositely arranged depending slotted brackets on the frame between the wheels thereof, a shaft having its ends received through the slots of the brackets, journals on the outer ends of the shaft, means connected to said journals, means on the frame connected with said first mentioned means for adjusting the shaft vertically with respect to the frame, spokes radiating from the frame, spiral cutters secured on the outer ends of the spokes, and means actuated by the drive wheels of the machine for revolving the shaft.

In testimony whereof I affix my signature.

THOMAS J. KULA.